United States Patent
Barreto et al.

(10) Patent No.: US 9,015,248 B2
(45) Date of Patent: Apr. 21, 2015

(54) MANAGING UPDATES AT CLIENTS USED BY A USER TO ACCESS A CLOUD-BASED COLLABORATION SERVICE

(75) Inventors: Tomas Barreto, Menlo Park, CA (US); Arshdeep Mand, Union City, CA (US); Miles Spielberg, Sunnyvale, CA (US); David Mackenzie, Daly City, CA (US); Sam Ghods, San Francisco, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/526,437

(22) Filed: Jun. 18, 2012

(65) Prior Publication Data

US 2013/0124638 A1 May 16, 2013

Related U.S. Application Data

(63) Continuation of application No. 13/524,501, filed on Jun. 15, 2012.

(60) Provisional application No. 61/560,685, filed on Nov. 16, 2011.

(51) Int. Cl.
 - *G06F 15/16* (2006.01)
 - *H04L 29/06* (2006.01)
 - *G06F 17/30* (2006.01)

(52) U.S. Cl.
 CPC ............. *G06F 15/16* (2013.01); *H04L 65/403* (2013.01); *G06F 17/30* (2013.01)

(58) Field of Classification Search
 CPC ....... H04L 65/403; H04L 67/04; H04L 51/32; G06F 15/16

USPC .......... 709/203, 216, 204–206; 707/201, 202, 707/783, 613, 203, 758, 656; 711/153

See application file for complete search history.

(56) References Cited

U.S. PATENT DOCUMENTS

| | | | |
|---|---|---|---|
| 5,787,175 | A | 7/1998 | Carter |
| 5,799,320 | A | 8/1998 | Klug |
| 5,848,415 | A | 12/1998 | Guck |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

International Search Report and Written Opinion for PCT/US2008/012973 dated Apr. 30, 2009, pp. 1-11.

(Continued)

*Primary Examiner* — Jungwon Chang
(74) *Attorney, Agent, or Firm* — Perkins Coie LLP

(57) ABSTRACT

System and method for managing updates at clients used by a user to access a cloud-based collaboration service are disclosed. In one aspect, embodiments of the present disclosure include a method, which may be implemented on a system, for storing a representation of the action to queues of clients associated with the user in a distributed database cluster based on an action type of an action performed by a collaborator of the user. The clients of the user are selected based on the client category and the action type of the action, to receive a notification as a result of the action or to perform a synchronization with changes that occurred as a result of the action.

24 Claims, 15 Drawing Sheets

(56) References Cited

U.S. PATENT DOCUMENTS

| | | |
|---|---|---|
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0133509 A1* | 9/2002 | Johnston et al. ............ 707/203 |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |

(56) References Cited

U.S. PATENT DOCUMENTS

| | | |
|---|---|---|
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1* | 11/2006 | Harward et al. ............ 707/2 |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1* | 1/2009 | Brodersen et al. ............ 707/202 |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1* | 8/2009 | Kim et al. ............ 709/203 |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1* | 10/2009 | Nair et al. ............ 707/201 |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1* | 8/2010 | Wang et al. ............ 707/610 |
| 2010/0198871 A1* | 8/2010 | Stiegler et al. ............ 707/783 |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |

(56) References Cited

U.S. PATENT DOCUMENTS

| | | |
|---|---|---|
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1* | 6/2011 | Pei et al. ................. 707/613 |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |

(56) References Cited

U.S. PATENT DOCUMENTS

FOREIGN PATENT DOCUMENTS

| | | | |
|---|---|---|---|
| CN | 102264063 | A | 11/2011 |
| EP | 0348614 | A2 | 1/1990 |
| EP | 0921661 | A2 | 6/1999 |
| EP | 1349088 | | 10/2003 |
| EP | 1528746 | A2 | 5/2005 |
| EP | 1933242 | A1 | 6/2008 |
| EP | 2372574 | A1 | 10/2011 |
| EP | 2610776 | A2 | 7/2013 |
| GB | 2453924 | A | 4/2009 |
| GB | 2471282 | A | 12/2010 |
| JP | 09-101937 | | 4/1997 |
| JP | 11-025059 | | 1/1999 |
| JP | 2003273912 | A | 9/2003 |
| JP | 2004310272 | A | 11/2004 |
| JP | 09-269925 | | 10/2007 |
| JP | 2008250944 | | 10/2008 |
| KR | 20020017444 | A | 3/2002 |
| KR | 20040028036 | | 4/2004 |
| KR | 20050017674 | A | 2/2005 |
| KR | 20060070306 | A | 6/2006 |
| KR | 20060114871 | A | 11/2006 |
| KR | 20070043353 | A | 4/2007 |
| KR | 20070100477 | A | 10/2007 |
| KR | 20100118836 | A | 11/2010 |
| KR | 20110074096 | A | 6/2011 |
| KR | 20110076831 | A | 7/2011 |
| WO | WO-0007104 | A1 | 2/2000 |
| WO | WO-0219128 | A1 | 3/2002 |
| WO | WO-2004097681 | A1 | 11/2004 |
| WO | WO-2006028850 | A2 | 3/2006 |
| WO | WO-2007024438 | A1 | 3/2007 |
| WO | WO-2007035637 | A2 | 3/2007 |
| WO | WO-2008011142 | A2 | 1/2008 |
| WO | WO-2008076520 | A2 | 6/2008 |
| WO | WO-2011109416 | A2 | 9/2011 |
| WO | WO-2012167272 | A1 | 12/2012 |
| WO | WO-2013009328 | A2 | 1/2013 |
| WO | WO-2013013217 | A1 | 1/2013 |
| WO | WO-2013041763 | A1 | 3/2013 |
| WO | WO-2013166520 | | 11/2013 |

OTHER PUBLICATIONS

Supplementary European Search Report European Application No. EP 08 85 8563 dated Jun. 20, 2011 pp. 1-5.
International Search Report and Written Opinion for PCT/US2011/039126 mailed on Oct. 6, 2011, pp. 1-13.
Partial International Search Report for PCT/US2011/041308 dated Feb. 27, 2012, pp. 1-2.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 28, 2013, 15 pages.
Exam Report for GB1313559.5, Applicant: Box, Inc., Mailed Aug. 22, 2013, 19 pages.
"Microsoft Office SharePoint 2007 User Guide," Feb. 16, 2010, pp. 1-48.
"Understanding Metadata," National Information Standards Organization, NISO Press, 2004, 20 pages.
International Search Report and Written Opinion for PCT/US2010/070366, Applicant: Box, Inc., Mailed Mar. 24, 2013, 10 pages.
International Search Report and Written Opinion for PCT/US2011/047530, Applicant: Box, Inc., Mailed Mar. 22, 2013, pp. 1-10.
International Search Report and Written Opinion for PCT/US2011/057938, Applicant: Box, Inc., Mailed Mar. 29, 2013, 10 pages.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
Lars, "35 Very Useful Online Tools for Improving your project Management and Team Collaboration," Apr. 31, 2010, tripwiremagazine.com, pp. 1-32.
Parr, "Google Docs Improves Commenting, Adds E-mail Notifications," Apr. 16, 2011, mashable.com, pp. 1-6.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
Search Report for EP 11729851.3, Applicant: Box, Inc. Mailed Feb. 7, 2014, 9 pages.
Search Report for EP14153783.7, Applicant: Box, Inc. Mailed Mar. 24, 2014, 7 pages.
John et al., "Always Sync Support Forums—View topic—Allway sync funny behavior," Allway Sync Support Forum at http://synccenter.com, Mar. 28, 2011, XP055109680, 2 pages.
Search Report for EP14151588.2, Applicant: Box, Inc. Mailed Apr. 15, 2014, 12 pages.
Search Report for EP13187217.8, Applicant: Box, Inc. Mailed Apr. 15, 2014, 12 pages.

(56) References Cited

OTHER PUBLICATIONS

Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Walker, "PDF.js project meeting notes," retrieved from the internet, http://groups.google.com, May 15, 2014, 1 page.
Sommerer, "Presentable Document Format: Improved On-demand PDF to HTML Conversion," retrieved from the internet, http://research.microsoft.com, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Cohen, "Debating the Definition of Cloud Computing Platforms," retrieved from the internet, http:://forbes.com, Feb. 3, 2014, 7 pages.
Partial Search Report for EP131832800, Applicant: Box, Inc. Mailed May 8, 2014, 5 pages.
Search Report for EP141509422, Applicant: Box, Inc. Mailed May 8, 2014, 7 pages.
Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web. Archive.org/web, 3 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web. Archive.org/web/20100413105758/http://en.wikipedia.org/wiki/Google_docs, Apr. 13, 2010, 6 pages.
Patent Court Document of Approved Judgment for GB0602349.3 and GB0623571.7; Mar. 3, 2009, 17 pages.
International Search Report and Written Opinion for PCT/US2013/034765, Applicant: Box, Inc., Mailed Jan. 20, 2014, 15 pages.
Exam Report for EP13185269.1, Applicant: Box, Inc. Mailed Jan. 28, 7 pages.
International Search Report and Written Opinion for PCT/US2011/060875 Mailed Oct. 30. 2012, pp. 1-10.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.

* cited by examiner

MANAGING UPDATES AT CLIENTS USED BY A USER TO ACCESS A CLOUD-BASED COLLABORATION SERVICE

CROSS-REFERENCE TO RELATED APPLICATIONS

This application claims the benefit of U.S. Provisional Patent Application No. 61/560,685 entitled "TEMPORAL AND SPATIAL PROCESSING AND TRACKING OF EVENTS IN A WEB-BASED COLLABORATION ENVIRONMENT FOR ASYNCHRONOUS DELIVERY IN AN ORDERED FASHION," which was filed on Nov. 16, 2011, the contents of which are incorporated by reference herein in its entirety.

This application is a continuation of U.S. patent application Ser. No. 13/524,501 entitled "RESOURCE EFFECTIVE INCREMENTAL UPDATING OF A REMOTE CLIENT WITH EVENTS WHICH OCCURRED VIA A CLOUD-ENABLED PLATFORM", which was filed on Jun. 15, 2012, which also claims the benefit of U.S. Provisional Patent Application No. 61/560,685 entitled "TEMPORAL AND SPATIAL PROCESSING AND TRACKING OF EVENTS IN A WEB-BASED COLLABORATION ENVIRONMENT FOR ASYNCHRONOUS DELIVERY IN AN ORDERED FASHION," which was filed on Nov. 16, 2011, the contents of which are incorporated herein by reference in their entirety.

BACKGROUND

With the increase of electronic and digital content being used in enterprise settings or other organizations as the preferred mechanism for project, task, and work flow management, as has the need for streamlined collaboration and sharing of digital content and documents. In such an environment, multiple users are sharing, accessing and otherwise performing actions or tasks on content and files in a shared work space, where any number of users may have access to a given file or may want to or need to perform an action on the file at any given time.

The cloud-based nature of such an environment enables users/collaborators to access, view, edit content anytime, from any device, or using any number of and/or types of clients, simultaneously while other collaborators in the same group, enterprise, or other types of formal/informal organizations may also be accessing, viewing, or editing the same file or content or content in the same work group. The different types of clients and number devices which can be used to access a single account or work item or work group the cloud content and environment introduces the problem of maintaining consistency and correct ordering in how changes are reflected at the clients used by users to access the cloud-based platform and content.

DETAILED DESCRIPTION

Figure 1:
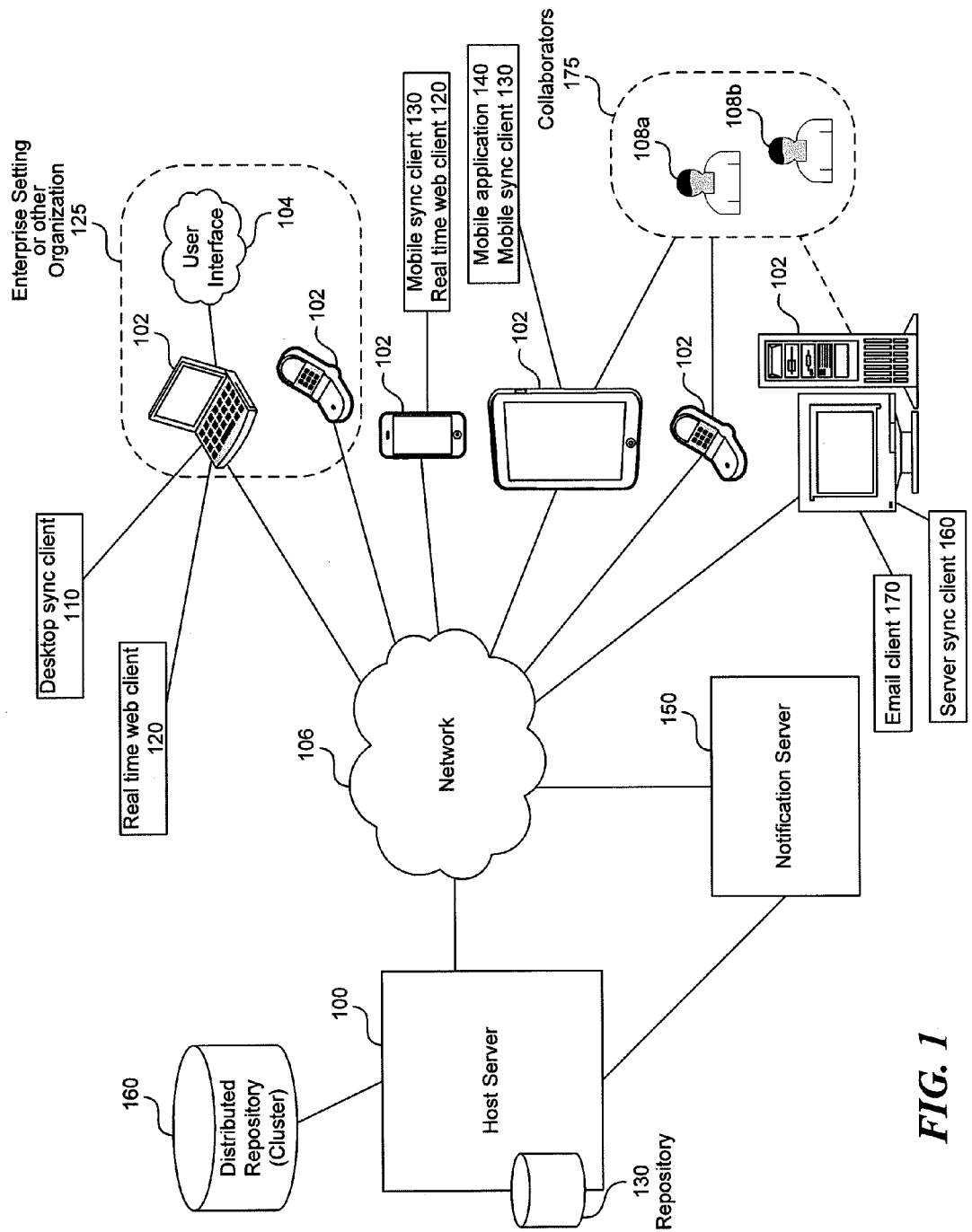
FIG. 1 illustrates an example diagram of a system having a host server of a cloud-enabled platform able to incrementally update remote clients at devices with events that occurred via the platform hosted by server.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for managing updates at clients used by a user to access a cloud-based collaboration service.

FIG. 1 illustrates an example diagram of a system having a host server 100 of a cloud-enabled platform able to incrementally update remote clients (clients 110, 120, 130, 140, 160) at devices 102 with events that occurred via the platform hosted by server 100.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and notification server 150 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100), any remote environment, or other types of services including any type of cloud-based service or storage environment.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
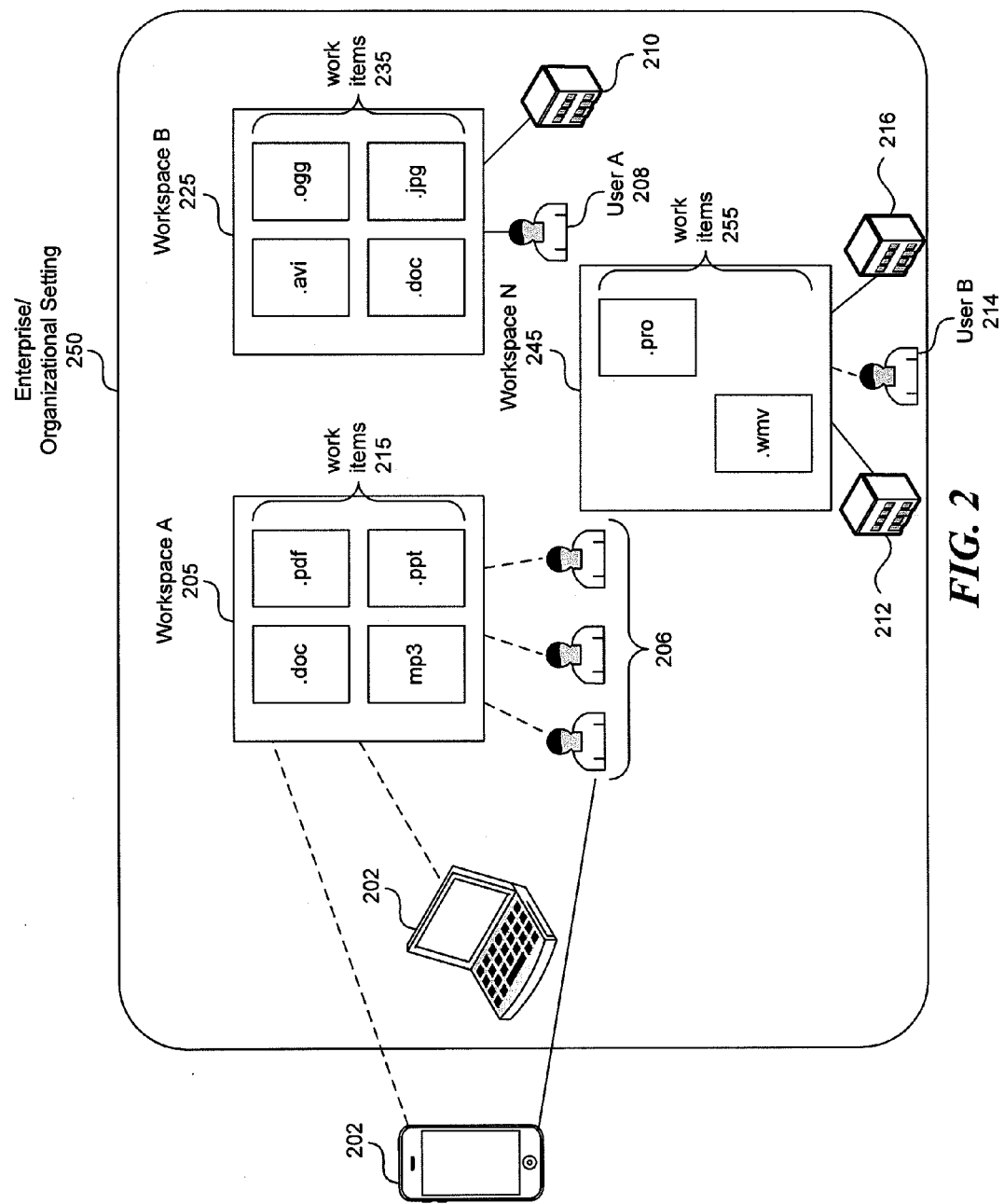
FIG. 2 depicts an example diagram of a web-based or online collaboration environment hosted by a cloud-based platform deployed or accessed by an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

Embodiments of the present disclosure relate to efficient updating of remote clients (110-170) on user devices 102 based on updates, changes that occur in the cloud environment at the host server 100 from user edits, updates, comments, etc. Since multiple users collaborate in the cloud-based environment hosted by server 100, user devices 102 need to be appropriately updated such that the most current versions of data/content are synchronized with the relevant user devices and that notification of events are sent to the relevant devices/users in a timely and orderly fashion. Any given user can utilize any number of clients and any number of types of clients (e.g., sync client, real time web client, mobile sync client, mobile application, email client, server sync client, etc.) at any given time. Thus, the host server 100 components further shown and described in FIGS. 4A-4B, FIGS. 5A-5D, and FIG. 6 facilitate the ordered syncing or updating of the remote clients which a given user/collaborator may use to access the cloud platform via any number of user devices 102.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), private WAN, a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1 xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration environment hosted by a cloud-based platform deployed or accessed by an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set a permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
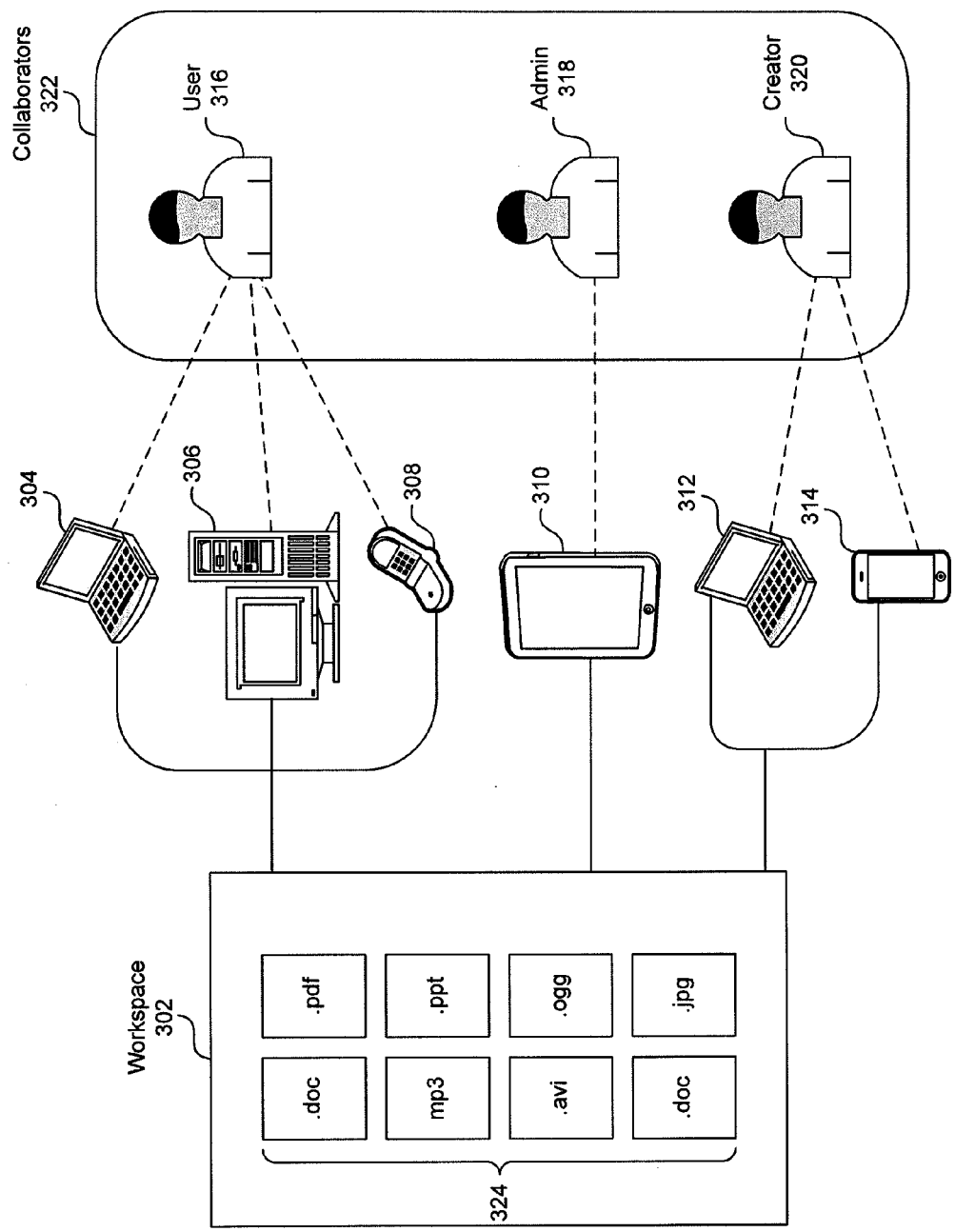
FIG. 3 depicts an example diagram of a workspace in a cloud-based platform such as an online, web-based or desktop collaboration environment accessible by multiple collaborators through various devices via a web interface, mobile client, or desktop client.

FIG. 3 depicts an example diagram of a workspace 302 in a cloud-based platform such as an online, web-based or desktop collaboration environment accessible by multiple collaborators 322 through various devices via a web interface, mobile client, or desktop client.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302 in accordance with the platform and/or application independent mechanisms disclosed herein. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same work space), either in the same work space 302 or in some other work space. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant work spaces, in the same user interface.

Figure 4A:
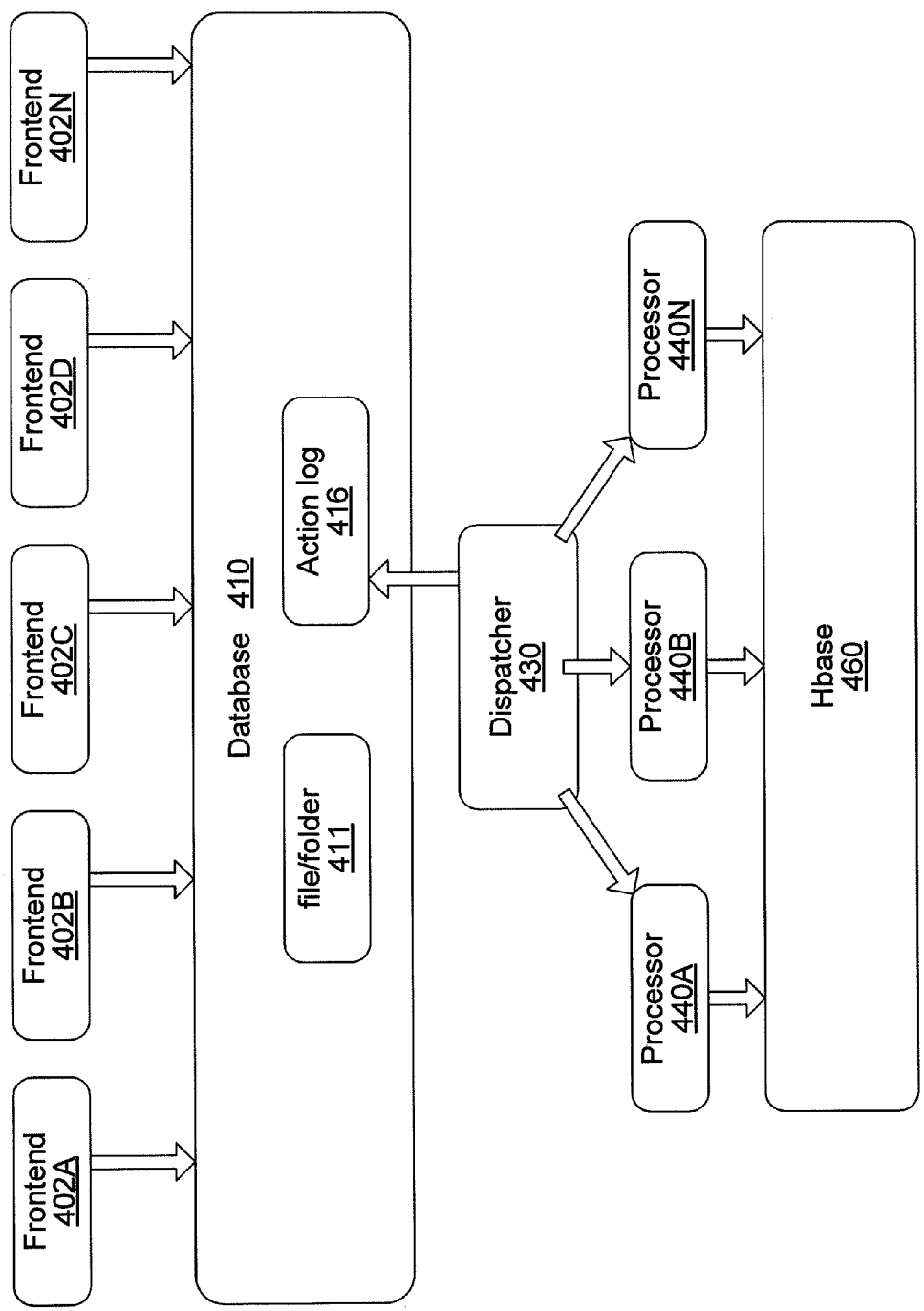
FIG. 4A depicts an example system block diagram showing the interaction between server-side components for incrementally updating a remote client with events or actions that occurred via a cloud-based platform.

FIG. 4A depicts an example system block diagram showing the interaction between server-side components for incrementally updating a remote client with events or actions that occurred via a cloud-based platform.

The server-side includes front end components 402A-N, a database 410, a dispatcher 430, one or more processors 440A-N, and a second database (e.g., Hbase 460). The front end components 402A-N can interface with client devices/end user devices to detect/identify transactions or events. The data or file change that occur as a result of the event is effectuated in the database 410 of the cloud-enabled platform (e.g., the relevant changes are made in the file table 411 of the database).

Depending on the type of action or event, an action log entry can be created and stored in the action log 416. In general, the front end 402 determines whether an action log entry is created from a given action or transaction. In general, an action log entry can be created for an action or event if certain durability requirements are to be met. The dispatcher 430 reads the action log entries from the action log 416 and sends them to the processors 440A-N where the fan-out, or collaborators to be notified of the event or to receive the file/data change as a result of the event is determined. Based on the computed fan-out or identified collaborators, the processors 440A-N writes the events/transactions to the relevant queues in the second database 460, from which remote clients can read.

Figure 4B:
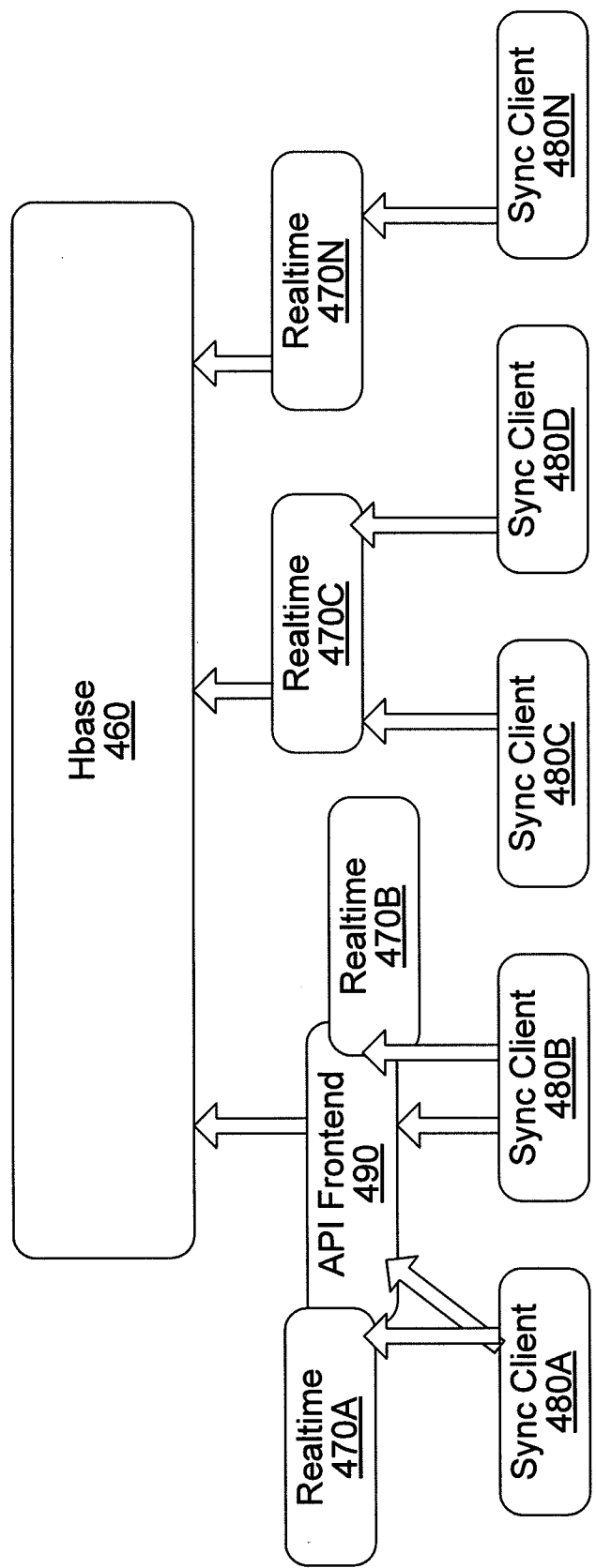
FIG. 4B depicts an example block diagram showing the interaction of remote clients and with a distributed database cluster for incremental updates of events/actions which occurred at a cloud-based environment.

FIG. 4B depicts an example block diagram showing the interaction of remote clients 470A-N and 480A-N with a distributed database cluster 460 for incremental updates of events/actions which occurred at a cloud-based environment. The remote clients can include, for example real time clients 470A-N (e.g., real-time web clients launched via a web browser, mobile application), and synchronization clients 480A-N (e.g., desktop sync, mobile sync, server sync, etc.) that users or collaborators use to interface/access the cloud-based platform including but not limited to a collaboration environment. Other types of clients may also read from the database cluster 460.

The queues in the database 460 (e.g., the distributed database cluster) are usually client type specific. For example, each queue is for a given client type for one given user. So, a user 'A' may have a sync client queue that all of the sync clients that user "A" uses reads from since user "A" may have multiple devices on which sync clients are installed. In general, the queues for clients in the database 460 are read only queues such that multiple clients can read from the same queue without making modifications. In this manner, if a user utilizes multiple sync clients, each client can still receive and detect the respective updates such that multiple devices can be synchronized. The remote clients also typically individually track the location in the queue from which they last read such that only the most recent events are updated at the client, and that the events read from a queue is specific to a given client, dependent on what has previously been synchronized or read.

In one embodiment, sync clients 480 connect to both real-time 470 and API front end 490 machines. The real time machines 470 can notify a sync client 480 when there has been an update in a user's account. The sync client 480 can then connect to API front end machine 490 to obtain the actual change/content. Alternatively, in some instances, the sync clients 480 can also obtain the changes/content/updates from the real time machines 470 simultaneous with the notification, or after being notified.

Figure 5A:
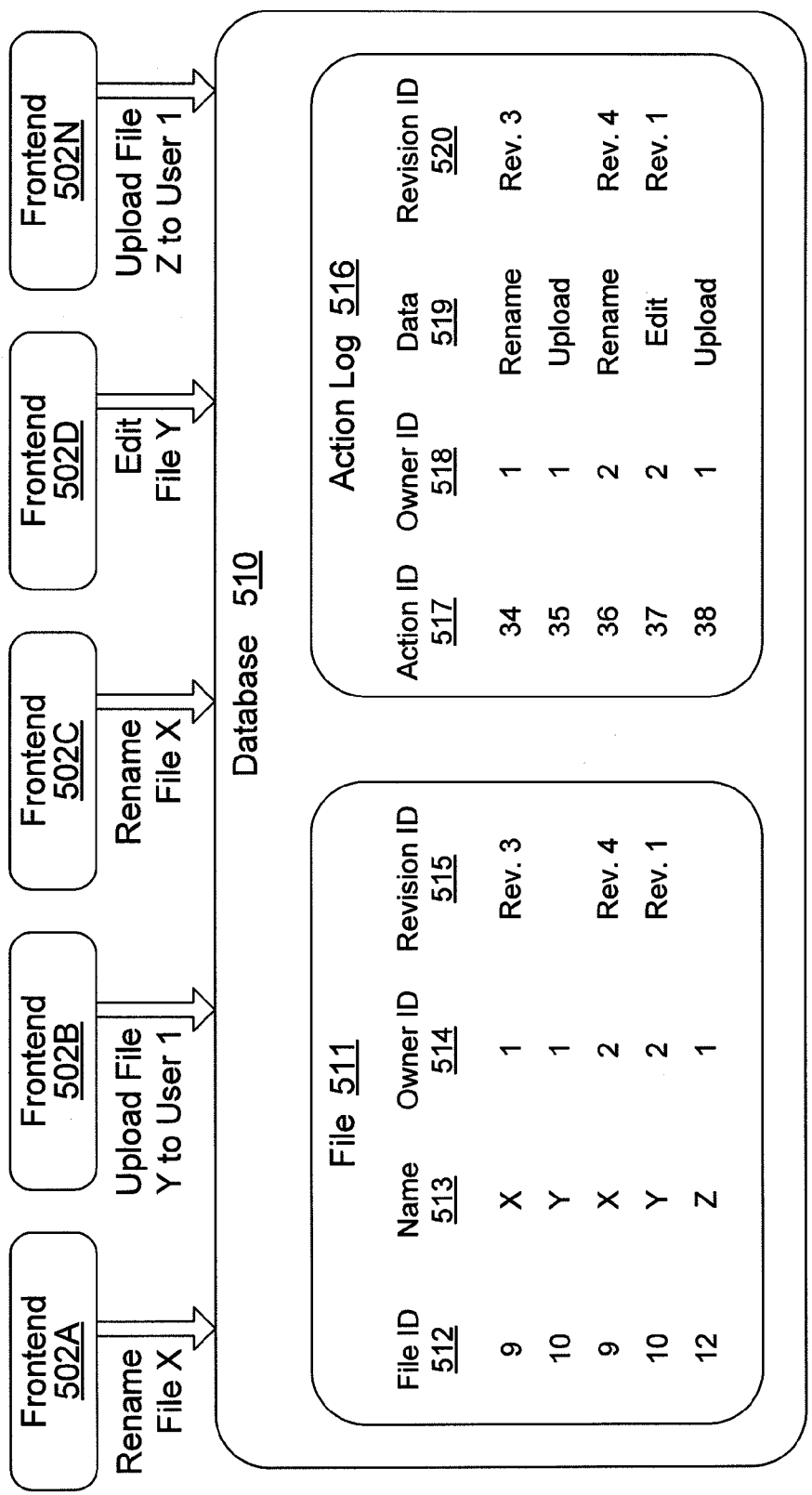
FIG. 5A depicts an example system block diagram showing action log entries recorded from actions/interactions on or with files/content stored in a database of a cloud-based environment.

FIG. 5A depicts an example system block diagram showing action log entries 516 recorded from actions/interactions on or with files/content 511 stored in a database 510 of a cloud-based environment.

The front ends 502A-N detect, identify, or receive the various actions or events on data or content performed by users or collaborators in a cloud-based environment. For example, events/actions can include by way of example but not limitation, file renames, file uploads/downloads, file edits, comments, etc. Based on the type of event, the front end 502 determines whether the action/event is to be created into a log entry to be stored in the action log 516. In creating a log entry, each action/event is recorded as a transaction with the file system change for asynchronous processing. In recording the transaction, the relevant file/folder row in the file 511 of the database 510 is inserted, updated, deleted, or otherwise modified according to the action. In one embodiment, the row is inserted in to the action log table 516 simultaneously with the write to the file 511 and also with the performance of action itself. Note that each entry includes an owner ID 514 in the file 511 and in the action log 516 to represent the owner of the item upon which an action occurred.

In one embodiment, action log entries are created in the same database 510 as the file table 511 such that file/content rollback can be performed if the file/data/content change results in an error or failure. As such, the action log entry creation in the action log table 516 can be created, in part, to meet durability (e.g., longevity) requirements of a given event/transaction (e.g., write events, or other edit events typically have higher durability requirements than a comment event, or a share event, etc.).

Action log entries can be created for select types of events or all events. For example, events/transactions such as file renames, file uploads may have higher durability requirements than a comment event, or a share event, in a sense that the changes from a file rename/file upload need to be maintained and updated at various respective clients for the relevant collaborators and the implication for missing a file rename or file upload is potentially more severe than missing a comment event or a share event, etc.

In general, action log entries are generally created for actions/events with higher durability requirements. Such a determination can be made by the front ends 502 as to whether a given event type is to be writing into the action log table 516. Action log entries may also be created for all events with durability requirements carried out down stream at event queues stored in the second database (e.g., the database 560 of FIG. 5D). Table 516 shows the action log entries created from the events stored in the file table 511.

The action log entries can be identified by the action ID 517. In addition, each action log entry can be associated with a user (e.g., owner) identifier 518, a data entry 519, and/or a revision identifier 520. The user identifier 518 can identify a user who is to a recipient as a result of an event (e.g., upload file to User 1). The owner identifier 518 represents the owner of the item upon which an action (e.g., represented by action ID 517) occurred and in general, each work item has no more than one owner. The data field 519 can identify the type of action/event (e.g., rename, upload, edit, comment, share, send, download, etc.).

The revision identifier 520 can indicate the version of any change made to a given file (e.g., edit, rename, upload, etc.). In one embodiment, the revision identifier 520 is derived from version tracking mechanisms (e.g., via revision ID 515) inherent to the database 510. The revision identifier 520 can used by remote clients to resolve conflicts in view of potentially conflicting events/transactions. For example, if a file is re-named twice and both events are synchronized/updated at a remote client, the client can use the rename event associated with the latest revision ID to make the necessary updates. This can ensure that the client is updated with the most current change regardless of when the events are read from the queue. Thus, even if the two rename events are writing to the queue for the client out of order, the client can still make the 'correct' update using the revision ID in case of conflicting changes.

Figure 5B:
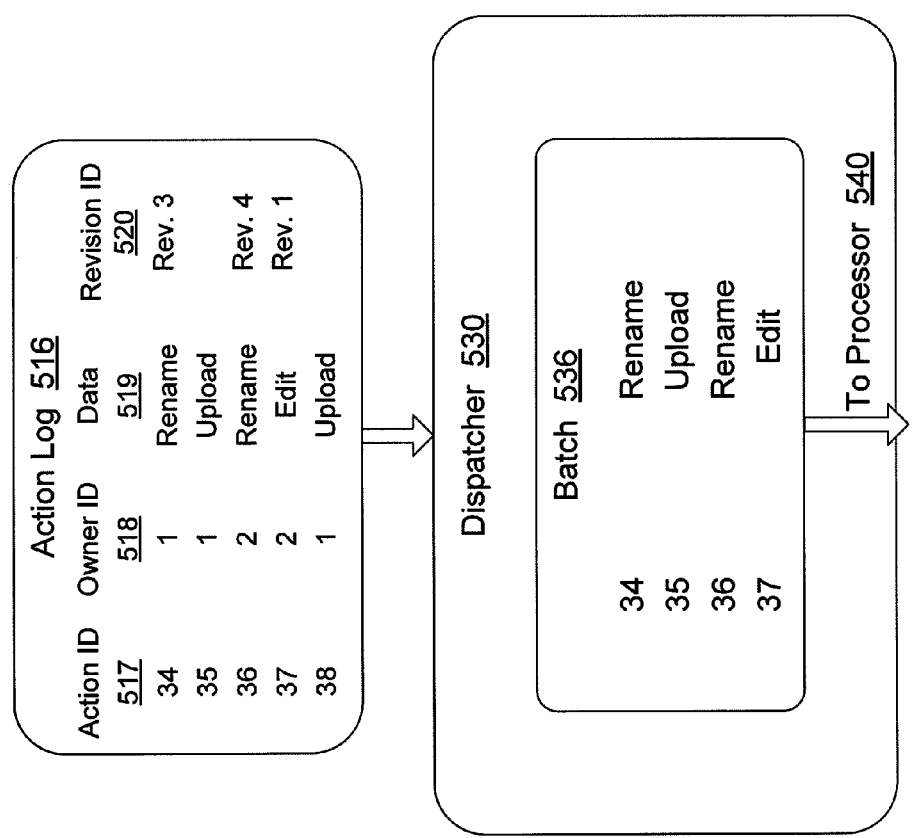
FIG. 5B depicts one example system block diagram showing action log entries
in the action log table being batched processed in series by a dispatcher.

FIG. 5B depicts one example system block diagram showing action log entries in the action log table 516 being processed by a dispatcher 530. In one embodiment, the dispatcher 530 sends out the action log entries to the processor 540 in parallel. In this embodiment, the action log entries in the action log table 516 are batch written in order by the dispatcher 530 to processors 540. The batch 536 includes log entries for multiple recently occurred to be written to queues for multiple collaborators after processing by the processor 540, which determines the relevant collaborators, for each log entry. The number of actions in the batch can be dynamically determined based on system load and/or to optimize performance.

Figure 5C:
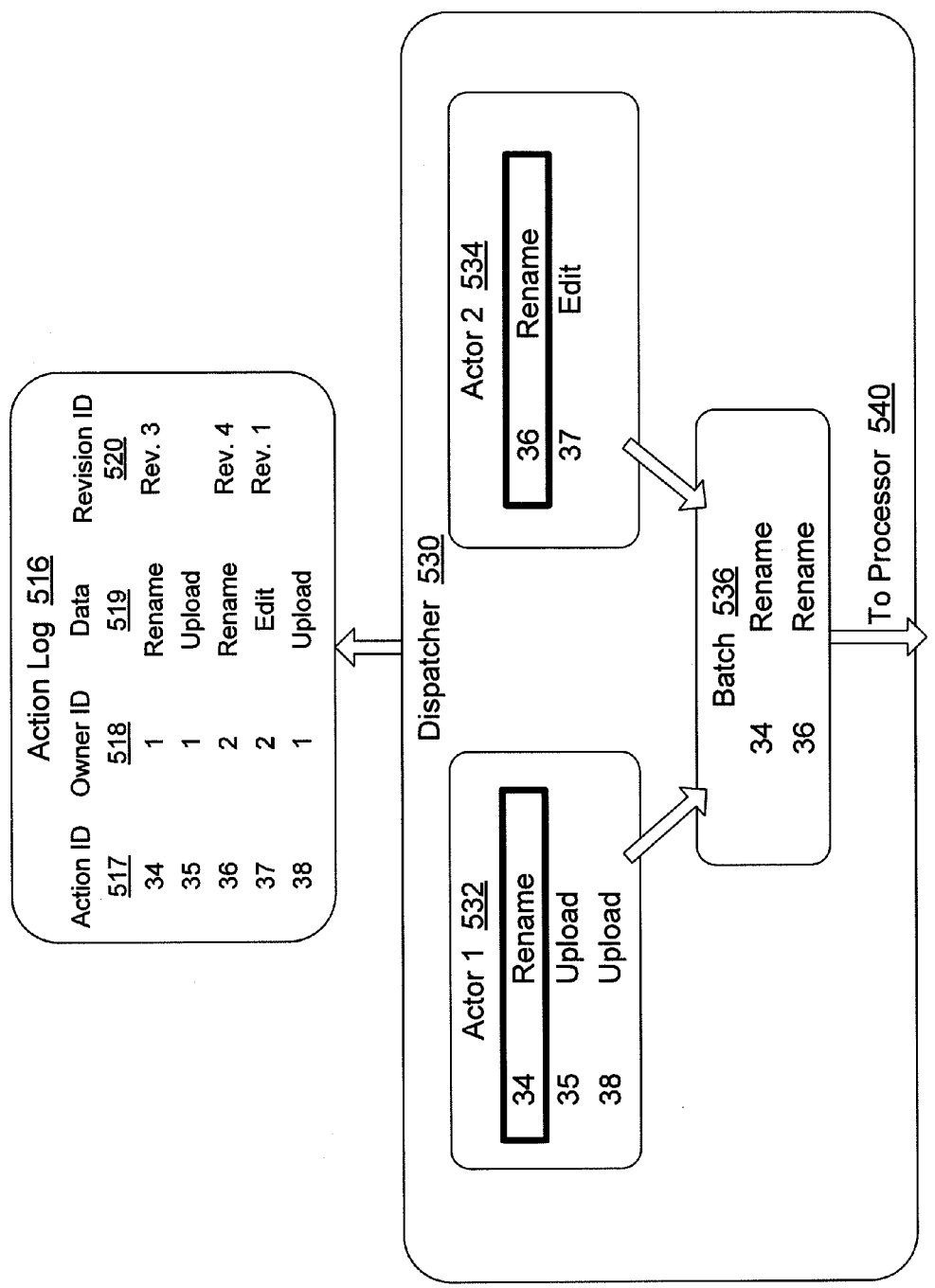
FIG. 5C depicts a second example system block diagram showing action log entries in the action log table being sorted by user (e.g., under actor 1 or actor 2) in the dispatcher and then processed in series across users prior to being batched to be sent to the processor.

FIG. 5C depicts a second example system block diagram showing action log entries in the action log table 516 being sorted by owner (e.g., under actor 1 or actor 2) in the dispatcher 530 and then processed in series across users prior to being batched to be sent to the processor 540. In this embodiment, the action log entries are sorted by user in the dispatcher 530 before being batched 536 to be sent to the processor 540. In other words, the events can be grouped by the owner. In some cases, this additional step can be implemented to ensure the correct ordering of events received at a remote client to prevent conflicting changes from being made to a file or content and/or applying the wrong ordering of these changes. After the events are sorted by owner, the events are batch written to the processor 540. The batching is performed by selecting the oldest event across all users and batch writing them to the processor 540.

Figure 5D:
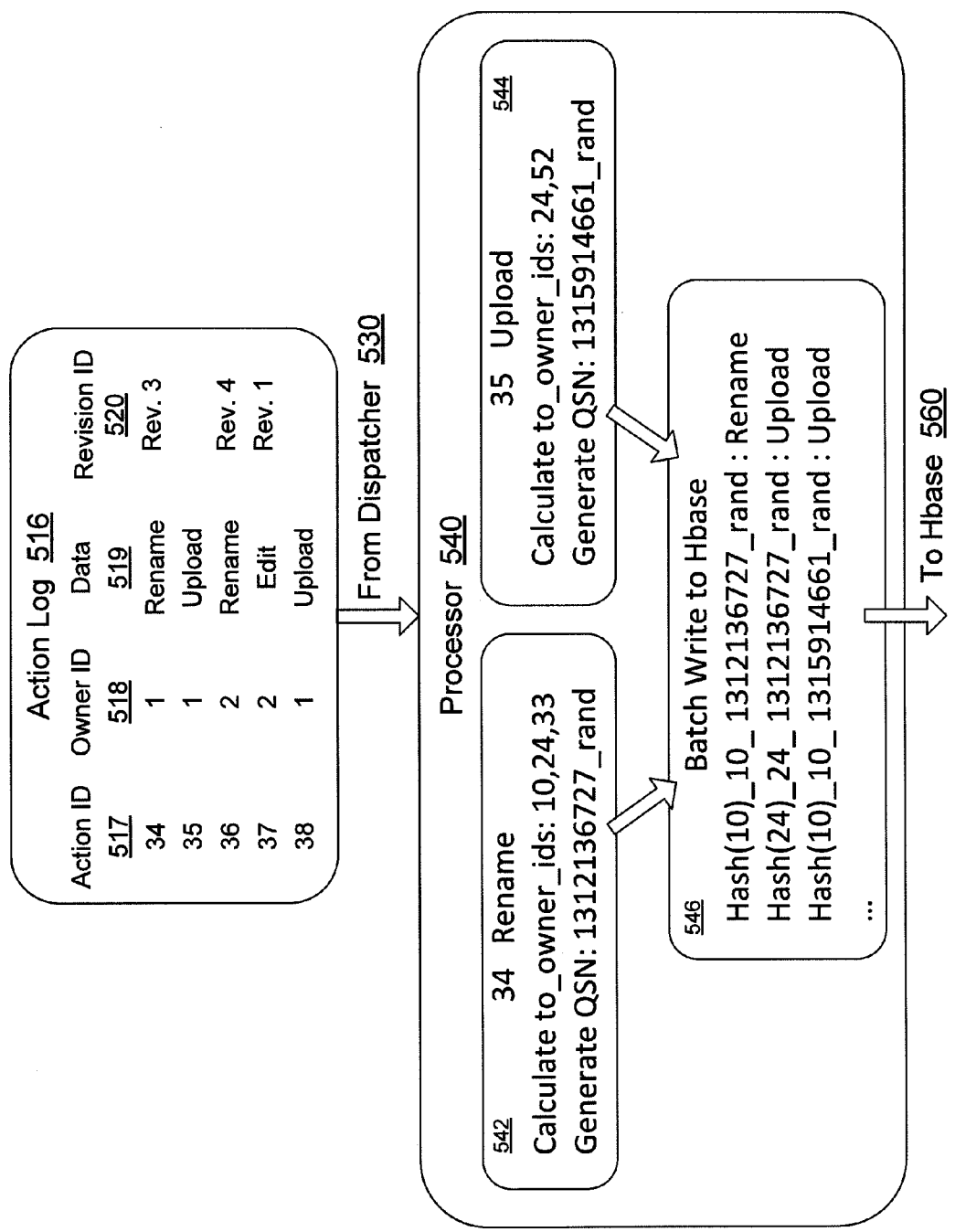
FIG. 5D depicts an example system block diagram showing how action log entries are written to queues in a distributed database cluster based on client and collaborator.

FIG. 5D depicts an example system block diagram showing how action log entries in the action log table 516 batched from the dispatcher 530 are written, by the processor(s) 540 to queues in a distributed database cluster 560 based on client and collaborator.

The processor 540 analyzes each action/transaction logged in the action log table 516, by for example, processing each row in the table 516 and determining the collaborators to whom each action/transaction is relevant. This determination can be based on user groups, user affiliation with enterprises, user rights/rules, etc. in the cloud-enabled platform such as a collaboration environment. In addition, the processor 540 analyzes each action/transaction and determines the client type category to which each action/transaction is relevant. For example, a re-name event may be relevant to both synchronization clients and real-time web clients, whereas, a comment event may only be relevant to a real-time web client. Once the relevant collaborator to whom to notify, or whose account is to be updated, and the relevant client(s) have been determined, the processor 540 writes the event to the relevant queues.

In general, each queue is specific to one client category type of a given user. For example, all sync clients of user 'John' will read from one queue. Each of John's sync clients, which may be installed on different devices maintains its own location in the queue from which to read such that the synchronization or update that is applicable to a specific device/ specific sync client is read from the queue in the second repository (e.g., a distribute database cluster, or Hbase 560). Since the queues in the second repository 560 are read only queues, the sync clients or other remote clients cannot modify the queue such that they can be read by other sync clients of the same user so that the necessary changes/updates are applied. In some embodiments, the system can implement one queue per client, or one client per user. In general, any number of other types of mappings can be made to HBase queues.

Since different client type categories are updated with different types of events, user John can have a separate queue for his real-time web clients, and another queue for other types of clients. Maintaining different queues for different client type categories of a user has a further advantage in cleaning up or purging data from the second database 560. Since events/actions written to queues are specific to the category type, during clean-up, the queues can be maintained with different life time durations. For example, queues for the real time web clients can be removed sooner or stored for lesser amount of time than queues for sync clients, due to the nature of events/actions written to the queues. For example, queues for real time web clients can be stored for on the order of a few days, or a few hours, whereas the queues for sync clients can be stored for days, weeks, or months, if needed.

Figure 6:
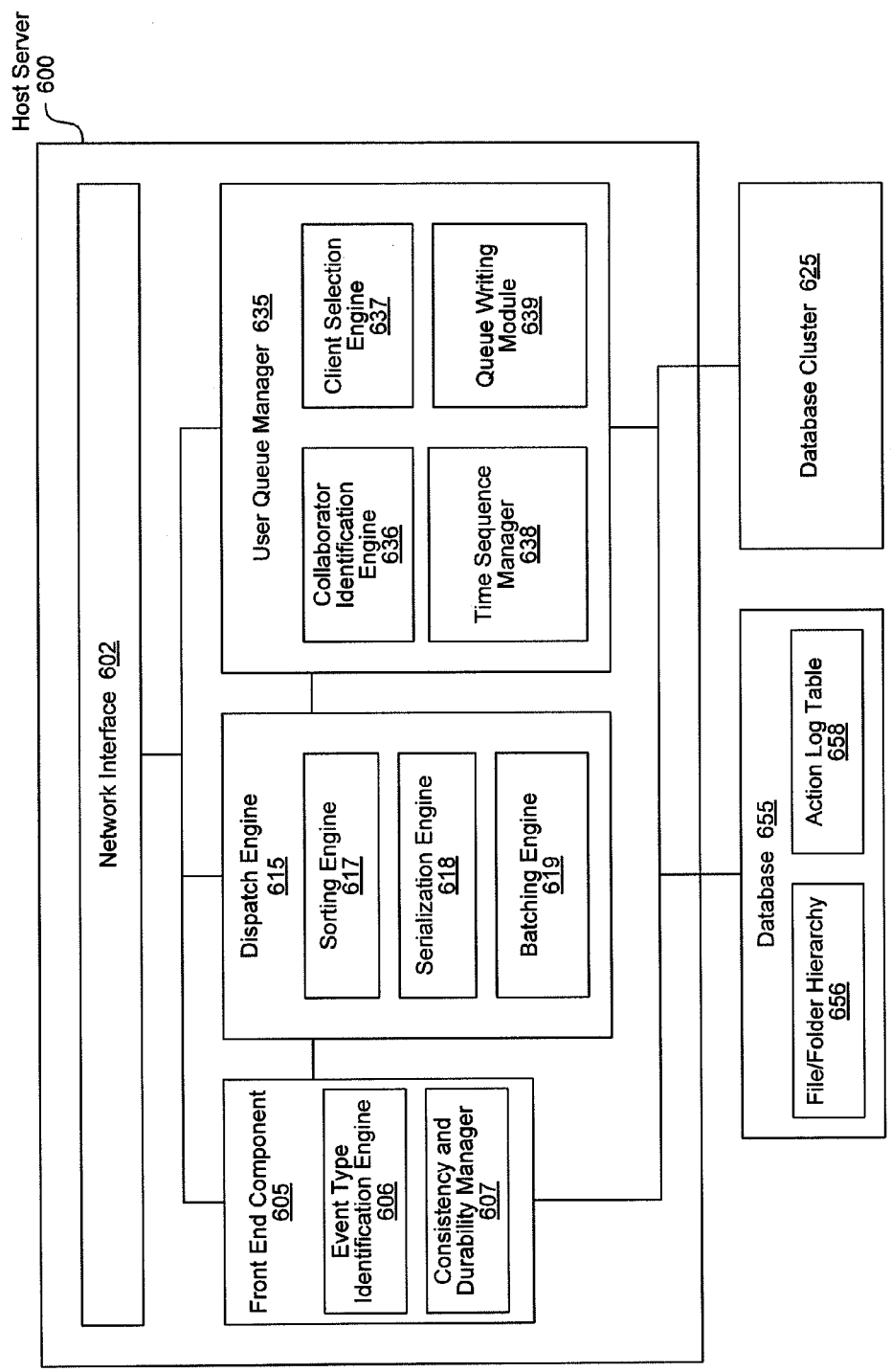
FIG. 6 depicts a block diagram illustrating an example system showing the aggregate of the components described in FIGS. 5A-5D on the server-side of the cloud-based platform for incrementally updating a remote client with occurred events or actions.

FIG. 6 depicts a block diagram illustrating an example system 600 showing the aggregate of the components described in FIGS. 5A-5D on the server-side of the cloud-based platform for incrementally updating a remote client with occurred events or actions.

The host server 600 can include a host of a collaboration environment can generally be a cloud-based service.

The host server 600 can include, for example, a network interface 602, a front end component 605 having an event type identification engine 606 and a consistency and durability manager, a dispatch engine 615 having a sorting engine 617, a serialization engine 618, a batching engine 619, and a user queue manager 635 having a collaborator identification engine 636, a client selection engine 637, a time sequence manager 638, and a queue writing module 639. The host server 600 is coupled to or includes a database 655 and a database cluster 625. Additional or less components/modules/engines can be included in the host server 600 and each illustrated component.

The network interface 602 can be a networking module that enables the host server 500 to mediate data in a network with an entity that is external to the host server 400, through any known and/or convenient communications protocol supported by the host and the external entity. The network interface 502 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. §101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The front end component 605 is able to detect actions in a cloud-based environment (e.g., a collaboration environment hosted by server 600) an identify the event type (e.g., by the event type identification engine 606). Based on the event type, an action log entry can be created in the database 655 in the action log table 658. The action log entry can be created from a file/folder entry 656. The front end component 605 can also determine or estimate the consistency and durability requirements of a given event (e.g., by the consistency and durability manager 607). These requirements can be effectuated through the creation of an action log entry for the associated action/event in the database 655.

The front end component 605 is coupled to multiple users and multiple devices and processes events/actions generated across multiple users, platforms, devices, or enterprises. The action log table 658 generated therefrom is read by the dispatch engine 615 which is able to serialize the events represented by the action log entries stored in the action log table 658. The dispatch engine 615 batches log entries (e.g., by the batching engine 619) from the table 658 and passes the events on to the user queue manager 635 for further processing. One embodiment of the dispatch engine 615 can further include a sorting engine 617 which optionally sorts the action log entries by recipient user or a user whose account is to be updated before being batched for processing by the user queue manager 635.

The user queue manager 635, retrieves each action log entry and is able to analyze the action/event and identify the collaborators (e.g., by the collaborator identification engine 636) who are to be notified of the action/event or whose accounts/contents are to be updated as a result of the action/event. Further, based on the action/event type the client category type (e.g., whether the client is a sync client, real-time web client, mobile client, mobile sync client, email client, etc.) which is to be notified or synchronized is determined by the client selection engine 637. Certain events/actions are only relevant to sync clients, while some may be relevant to both sync clients and web clients.

The time sequence manager 638 is able to associate events with a time stamp or a key. The time stamp or key (which may be a reference to a location in memory or storage) can be used by remote clients to keep track of the events/actions that have been synchronized or read for updating.

Figure 7:
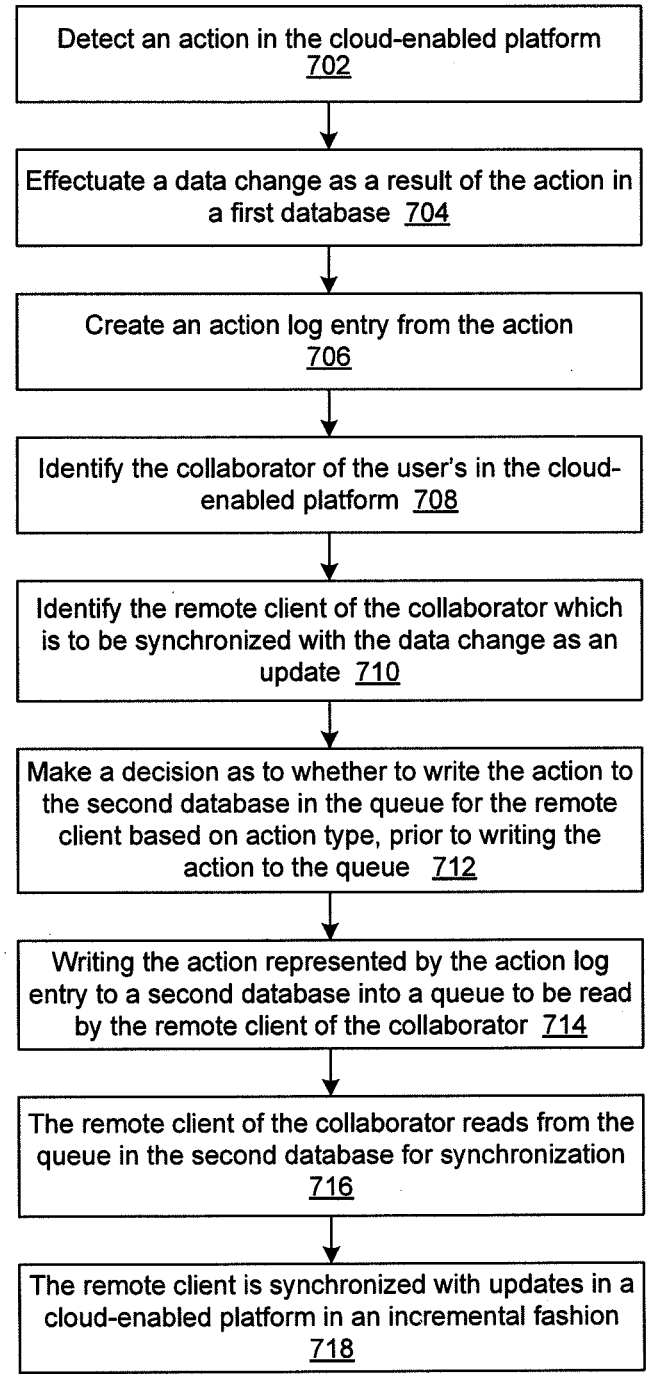
FIG. 7 depicts a flow chart illustrating an example process for notifying a remote client of updates in a cloud-enabled platform for each remote client associated with a collaborator in an incremental fashion.

FIG. 7 depicts a flow chart illustrating an example process for notifying a remote client of updates in a cloud-enabled platform for each remote client associated with a collaborator in an incremental fashion.

In process 702, an action is detected in the cloud-enabled platform. The action can be performed by any user or collaborator of a user group, organization, or enterprise and can include any action (e.g., upload, comment, share, email, send, download, edit, delete, rename, name, etc.) performed on files, folders, or any content shared, stored, and/or accessed via the cloud-enabled platform, such as an online or web-based collaboration environment.

In process 704, a data change is effectuated as a result of the action in a first database, in the cloud environment, based on the action. In process 706, an action log entry is created from the action. In one embodiment, the action log entry is created in the first database, same as the data change, to enable rollback to previous versions before the data change was effectuated.

In process 708, the collaborator of the user's in the cloud-enabled platform is identified. The collaborator(s) can be identified based on user group information, enterprise affiliation or other group/rules based definition of work groups which determine which users are collaborators to be notified of a given event, or which user accounts are to be updated. In process 710, the remote client of the collaborator which is to be synchronized with the data change as an update is identified.

In process 712, a decision is made as to whether to write the action to the second database in the queue for the remote client based on action type, prior to writing the action to the queue. In addition a decision can be made as to whether to write the action to the second database for the remote client based on client type, prior to writing the action to the queue.

In process 714, the action represented by the action log entry is written to a second database into a queue to be read by the remote client of the collaborator. In general, the queue is specific to a client type of the remote client. The client type can be a synchronization client, a mobile client, or a web-based interface client to access the cloud-enabled platform. A synchronization client can be any client installed on a device, which automatically synchronizes locally stored content with content in the cloud (e.g., in the cloud-enabled platform) such that the changes made by other users or the user of the device from other devices/clients/interfaces can be synced locally at the device. The web-based interface client can be any web interface used by the user to access his/her account with the cloud-enabled platform.

In instances where the collaborator or user utilizes multiple synchronization clients, each of the multiple synchronization clients can read from the queue at locations relevant to the individual remote client. For example, each of the multiple remote clients individually tracks a location in the queue from which each previously read. In general, the queue is a read-only queue such that clients can read from it without making changes such that other clients can still read from the queue and update the client/device as needed and as relevant.

The action can be written to a second queue for a web-application interface to the cloud-enabled platform. The action can also be to a third queue for an audit log. The queue may be associated with a lifetime to be stored in the second database to ensure durability requirements associated with the client type. For example, the lifetime for a queue for a desktop synchronization client can be longer than the life time for a queue for a web-based browser client.

In one embodiment, the action is written to the second queue as a part of a batch of recently occurred actions to be written to queues for multiple collaborators. The number of actions in the batch can be dynamically determined.

In process 716, the remote client of the collaborator reads from the queue in the second database for synchronization. The remote client can read from the queue such that the remote client is updated to reflect the action. For example, the remote client sends a query to the second database for synchronization of the updates specific to the collaborator.

The query can be associated with a timing parameter specified by the remote client such that the updates that are synchronized to the remote client include actions which are more recent than a time referenced by the timing parameter. Similarly, the query can be associated with a parameter specified by the remote client such that the updates that are synchronized to the remote client include actions which are written to the queue after a location referenced b the parameter.

In one embodiment, the remote client updates only the action without updating other actions which have previously been updated at the remote client. In process 718, the remote client is synchronized with updates in a cloud-enabled platform in an incremental fashion. This allows the remote client, such as a synchronization client to efficiently update the local device without the need to perform additional analysis or comparison as to which changes made on the server side have been or have yet to be made on the local device.

Figure 8:
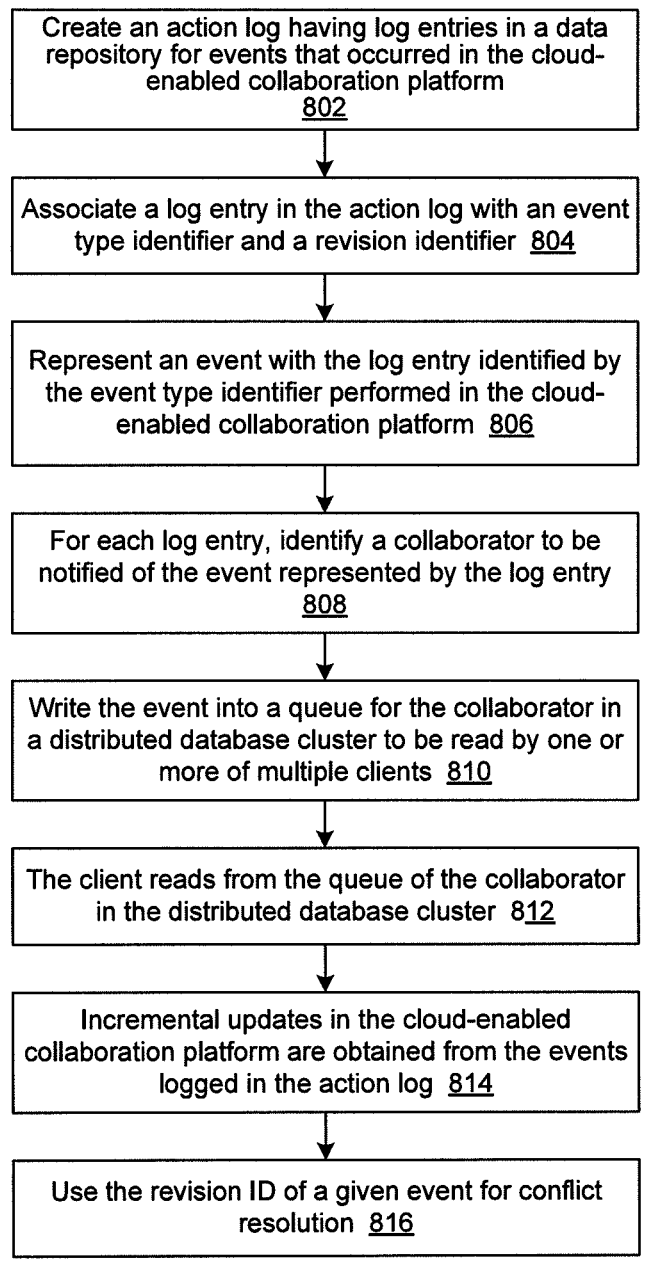
FIG. 8 depicts a flow chart illustrating an example process for creating an action log entry with a revision identifier for a client to be updated in time sequential order based on when events occurred via the cloud-enabled platform to prevent conflicts in files or data.

FIG. 8 depicts a flow chart illustrating an example process for creating an action log entry with a revision identifier for a client to be updated in time sequential order based on when events occurred via the cloud-enabled platform to prevent conflicts in files or data.

In process 802, an action log having log entries is created in a data repository for events that occurred in the cloud-enabled collaboration platform. Each log entry can be associated with a unique identifier, and where, each log entry can be entered in the action log in an order in which an associated action occurred in the cloud-enabled collaboration platform. In one embodiment, each log entry is created from a file entry stored in the data repository. The data repository can include a relational database such as a SQL database.

In process 804, a log entry in the action log is associated with an event type identifier and a revision identifier. The revision identifier of a given event can be used by the client for conflict resolution. The revision identifier can be derived from version trackers used by the SQL database.

The log entry can be further associated with a user identifier. In some instances, the log entries are sorted based on the user identifiers. In one embodiment, the user identifier is associated with a recipient user whose account is to be updated as a result of the event. In one embodiment, the user identifier can be associated with a user who performed the event or action.

In process 806, an event is represented with the log entry identified by the event type identifier performed, in the cloud-enabled collaboration platform. In process 808, a collaborator to be notified of the event represented by the log entry is identified, for each entry. In process 810, the event is written into a queue for the collaborator in a distributed database cluster to be read by one or more of multiple clients. The distributed database cluster can include non-relational databases. For example, the distributed database cluster is a write-optimized or optimized for sequential reads. In on embodiment, the distributed database cluster is an HBase cluster. In one embodiment, the queue for the collaborator is specific to a client or a client category type used by the collaborator for accessing the cloud-enabled collaboration platform.

Figure 9:
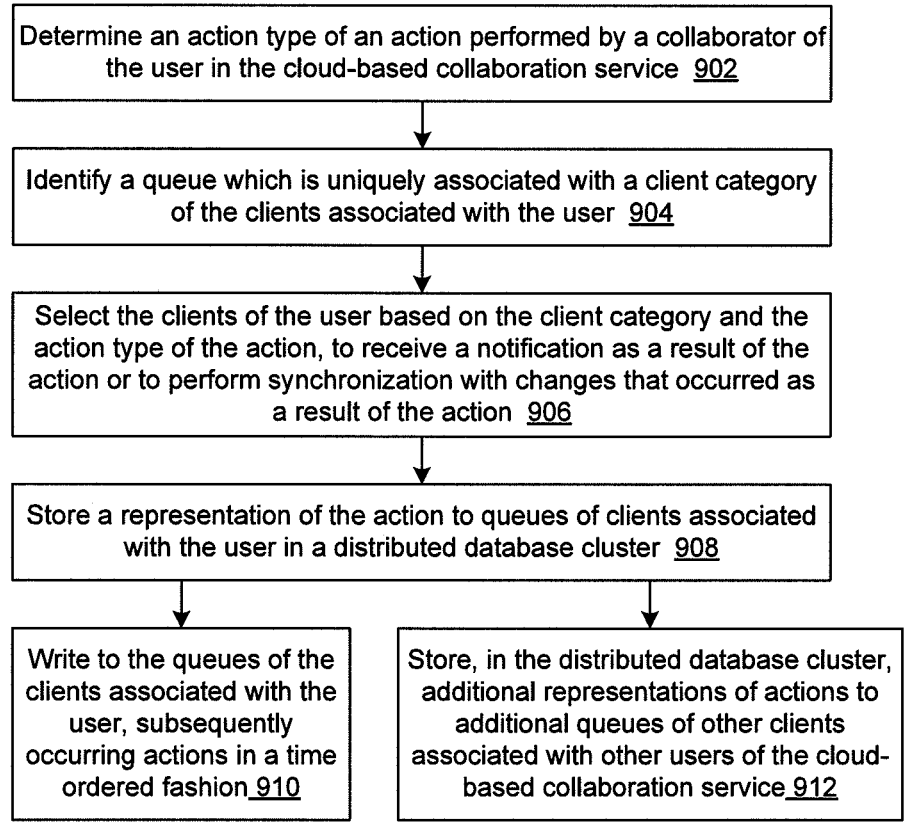
FIG. 9 depicts a flow chart illustrating an example process for managing queues based on action type and client type.

In general, different portions of the ordered sequence of events can be sent to different client types or different clients of the collaborator. The client type can include, a web-based client, a desktop synchronization client, a mobile synchronization client, a mobile application, an email notification client, or an enterprise action log of the cloud-enabled collaboration platform. In one embodiment, the event is written to the distributed database cluster as a part of a batch of recently occurred events to be written to queues for multiple collaborators In process 812, the client reads from the queue of the collaborator in the distributed database cluster to obtain incremental updates in the cloud-enabled collaboration platform from the events logged in the action log. In process 814, Incremental updates in the cloud-enabled collaboration platform are obtained from the events logged in the action log. In process 816, the revision ID of a given event for conflict resolution FIG. 9 depicts a flow chart illustrating an example process for managing queues based on action type and client type.

In process 902, an action type of an action performed by a collaborator of the user in the cloud-based collaboration service is determined. In process 904, a queue which is uniquely associated with a client category of the clients associated with the user is identified. The client can include cloud-based collaboration service and/or an instance of a desktop synchronization client to synchronize content with the cloud-based collaboration service.

In process 906, the clients of the user, to receive a notification as a result of the action or to perform synchronization with changes that occurred as a result of the action are selected based on the client category and the action type of the action. In process 908, a representation of the action is stored to queues of clients associated with the user in a distributed database cluster. Each of the queues is typically uniquely associated with a client category of the clients associated with the user and the clients of the user are selected based on the client category and the action type of the action, to receive a notification as a result of the action or to perform a synchronization with changes that occurred as a result of the action.

In process 910, subsequently occurring actions are written to the queues of the clients associated with the user in a time ordered fashion. In process 912, additional representations of actions to additional queues of other clients associated with other users of the cloud-based collaboration service are stored in the distributed database cluster.

Figure 10:
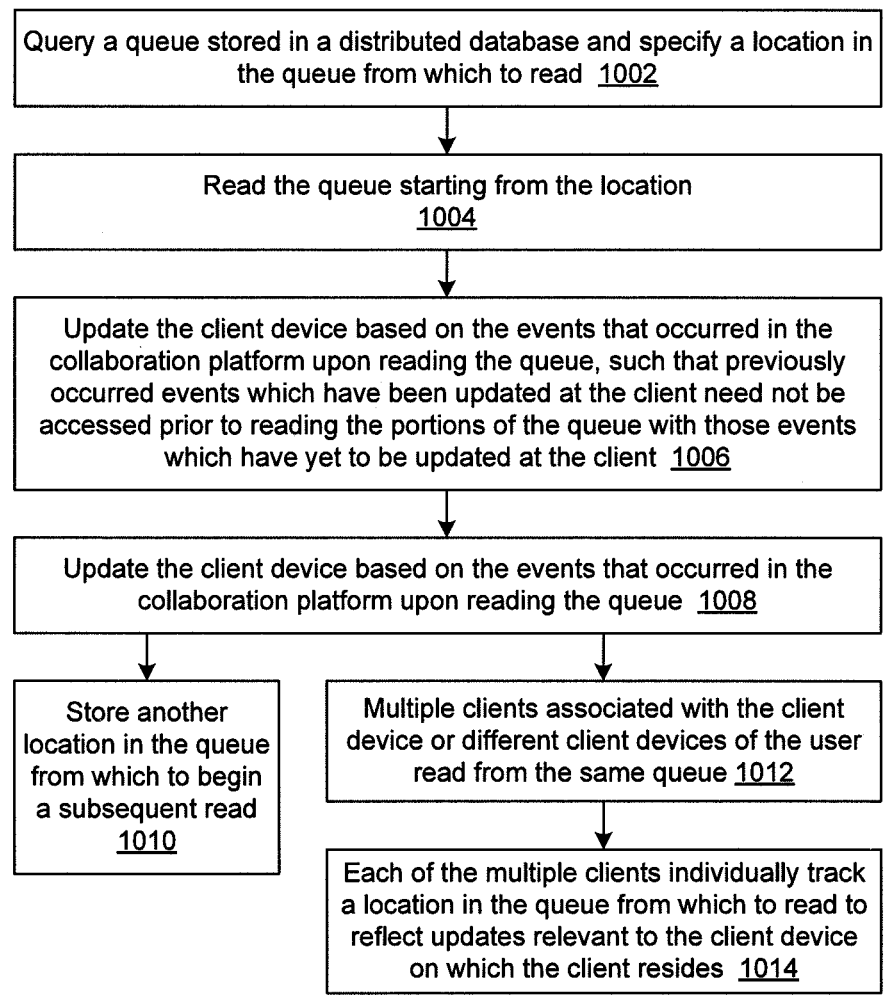
FIG. 10 depicts a flow chart illustrating an example process for updating multiple clients at one or more devices for a given user with events occurring in a collaboration platform.

FIG. 10 depicts a flow chart illustrating an example process for updating multiple clients at one or more devices for a given user with events occurring in a collaboration platform.

In process 1002, a queue stored in a distributed database queried and a location in the queue from which to read is specified. The queue includes entries representing each of a sequence of events which occurred in the collaboration platform that is relevant to the user. In one embodiment, the queue that is queried is specific to client type of the client and is also specific to a user. Each entry can be associated with an action type identifier of a given event; entry can further be associated with a revision identifier, the client uses the revision identifier for conflict resolution at the client device.

In process 1004, the queue is read starting from the location. In process 1006, the client device is updated based on the events that occurred in the collaboration platform upon reading the queue. This is performed in such a manner that previously occurred events which have been updated at the client need not be accessed prior to reading the portions of the queue with those events which have yet to be updated at the client.

In process 1008, the client device is updated based on the events that occurred in the collaboration platform upon reading the queue. The collaboration platform can include a cloud-based service and/or storage platform. In process 1010, another location in the queue from which to begin a subsequent read is stored by the client. In process 1012, multiple clients associated with the client device or different client devices of the user read from the same queue. In process 1014, each of the multiple clients individually track a location in the queue from which to read to reflect updates relevant to the client device on which the client resides.

Figure 11:
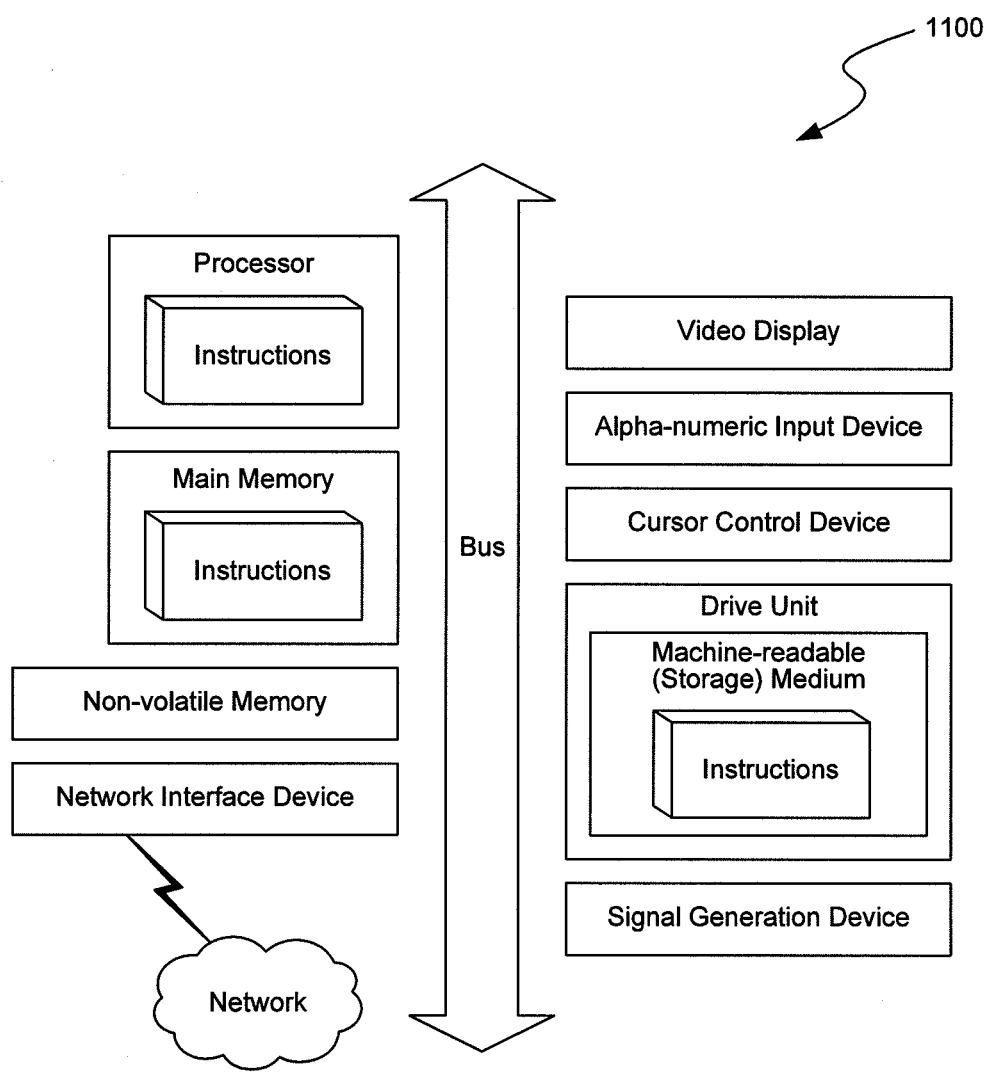
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for updating a client at a client device with events occurring in a collaboration platform, comprising:
    querying a queue stored in a distributed database and specifying a location in the queue from which to read,
        wherein, the queue that is queried is specific to client type of the client and is also specific to a user,
        wherein, the queue includes entries representing each of a sequence of events which occurred in the collaboration platform that is relevant to the user;
    reading the queue starting from the location in the queue such that previously occurring events that have been updated at the client need not be accessed prior to reading the portions of the queue with those events which have yet to be updated at the client,
    wherein, multiple clients associated with the client device or different client devices of the user read from the same queue, and each of the multiple clients individually track a location in the queue from which to read to reflect updates relevant to the client device on which the client resides.

2. The method of claim 1, further comprising, updating the client device based on the events that occurred in the collaboration platform upon reading the queue.

3. The method of claim 1, further comprising, storing another location in the queue from which to begin a subsequent read.

4. The method of claim 1, wherein, each entry is associated with an action type identifier of a given event.

5. The method of claim 1, wherein, each entry is associated with a revision identifier; wherein, the client uses the revision identifier for conflict resolution at the client device.

6. The method of claim 1, wherein, the collaboration platform includes a cloud-based service and storage platform.

7. A system for updating a client at a client device with events occurring in a collaboration platform, the system comprising:
one or more processors;
a memory unit having instructions stored thereon which, when executed by the one or more processors, cause the system to:
query a queue stored in a distributed database and specifying a location in the queue from which to read,
wherein, the queue that is queried is specific to client type of the client and is also specific to a user,
wherein, the queue includes entries representing each of a sequence of events which occurred in the collaboration platform that is relevant to the user;
read the queue starting from the location in the queue such that previously occurring events that have been updated at the client need not be accessed prior to reading the portions of the queue with those events which have yet to be updated at the client,
wherein, multiple clients associated with the client device or different client devices of the user read from the same queue, and each of the multiple clients individually track a location in the queue from which to read to reflect updates relevant to the client device on which the client resides.

8. The system of claim 7, wherein the instructions, when executed by the one or more processors, further cause the system to update the client device based on the events that occurred in the collaboration platform upon reading the queue.

9. The system of claim 8, wherein the instructions, when executed by the one or more processors, further cause the system to store another location in the queue from which to begin a subsequent read.

10. The system of claim 7, wherein, each entry is associated with an action type identifier of a given event.

11. The system of claim 7, wherein, each entry is associated with a revision identifier; wherein, the client uses the revision identifier for conflict resolution at the client device.

12. The system of claim 7, wherein, the collaboration platform comprises a cloud-based service and storage platform.

13. A method for managing updates at clients used by a user to access a cloud-based collaboration service such that the clients are updated with actions performed by collaborators, comprising:
based on an action type of an action performed by a collaborator of the user in the cloud-based collaboration service,
storing a representation of the action to queues of clients associated with the user in a distributed database cluster,
wherein, each of the queues is uniquely associated with a client category of the clients associated with the user;
wherein, the clients of the user are selected based on the client category and the action type of the action, to receive a notification as a result of the action or to perform a synchronization with changes that occurred as a result of the action,
receiving a query for a queue stored in the distributed database cluster, the query specifying a location in the queue from which to read,
wherein, the queue that is queried is specific to client type of the client and a user,
wherein, the queue includes entries representing each of a sequence of events which occurred in the collaboration platform that is relevant to the user;
providing data starting from the location in the queue such that previously occurring events that have been updated at the client need not be accessed prior to reading the portions of the queue with those events which have yet to be updated at the client,
wherein, multiple clients associated with the client device or different client devices of the user read from the same queue, and each of the multiple clients individually track a location in the queue from which to read to reflect updates relevant to the client device on which the client resides.

14. The method of claim 13, wherein, the client includes an instance of a web browser having loaded thereon a web-based client to access the cloud-based collaboration service.

15. The method of claim 13, wherein, the client includes an instance of a desktop synchronization client to synchronize content with the cloud-based collaboration service.

16. The method of claim 13, further comprising, receiving a request to write to the queues of the clients associated with the user, the writing including writing subsequently occurring actions in a time ordered fashion.

17. The method of claim 13, further comprising, storing, in the distributed database cluster, additional representations of actions to additional queues of other clients associated with other users of the cloud-based collaboration service.

18. The method of claim 13, further comprising, effectuating a data change associated with the action.

19. A non-transitory computer readable storage medium having instructions stored thereon which, when executed by one or more processors, causes a system to:
query a queue stored in a distributed database and specifying a location in the queue from which to read,
wherein, the queue that is queried is specific to client type of the client and is also specific to a user,
wherein, the queue includes entries representing each of a sequence of events which occurred in the collaboration platform that is relevant to the user;
read the queue starting from the location in the queue such that previously occurring events that have been updated at the client need not be accessed prior to reading the portions of the queue with those events which have yet to be updated at the client,
wherein, multiple clients associated with the client device or different client devices of the user read from the same queue, and each of the multiple clients individually track a location in the queue from which to read to reflect updates relevant to the client device on which the client resides.

20. The computer readable medium of claim 19, wherein the instructions, when executed by the one or more processors further cause the system to update the client device based on the events that occurred in the collaboration platform upon reading the queue.

21. The computer readable medium of claim 19, wherein the instructions, when executed by the one or more processors further cause the system to store another location in the queue from which to begin a subsequent read.

22. The computer readable medium of claim 19, wherein, each entry is associated with an action type identifier of a given event.

23. The computer readable medium of claim 19, wherein, each entry is associated with a revision identifier; wherein, the client uses the revision identifier for conflict resolution at the client device.

24. The computer readable medium of claim 19, wherein, the collaboration platform includes a cloud-based service and storage platform.

* * * * *